United States Patent [19]
Lizak

[11] Patent Number: 6,159,510
[45] Date of Patent: Dec. 12, 2000

[54] METHOD OF BIOCONVERSION OF INDUSTRIAL OR AGRICULTURAL CELLULOSE CONTAINING WASTES

[75] Inventor: Yuri Lizak, Ashdod, Israel

[73] Assignee: Bio-Feed Ltd., Ashdod, Israel

[21] Appl. No.: 09/485,303

[22] PCT Filed: Sep. 10, 1998

[86] PCT No.: PCT/IL98/00437

§ 371 Date: Feb. 8, 2000

§ 102(e) Date: Feb. 8, 2000

[87] PCT Pub. No.: WO99/12429

PCT Pub. Date: Mar. 18, 1999

[30] Foreign Application Priority Data

Sep. 11, 1997 [IL] Israel ......................................... 121744

[51] Int. Cl.[7] .............................. A23B 7/155; A23K 1/12; A23K 1/14
[52] U.S. Cl. .................................. 426/8; 426/53; 426/54; 426/61; 426/62
[58] Field of Search ................................... 426/8, 53, 54, 426/61, 62

[56] References Cited

U.S. PATENT DOCUMENTS

| | | | |
|---|---|---|---|
| 3,711,392 | 1/1973 | Metzger | 204/180 |
| 5,198,252 | 3/1993 | Simsa et al. | 426/53 |

FOREIGN PATENT DOCUMENTS

| | | |
|---|---|---|
| 3340662 | 5/1985 | Germany . |
| 08183686 | 7/1996 | Japan . |

*Primary Examiner*—Chhaya D. Sayala
*Attorney, Agent, or Firm*—Mark M. Friedman

[57] ABSTRACT

A method of bioconversion of organic industrial or agricultural cellulose containing wastes into proteinaceous product. The method comprises comminution of the wastes with moistening and addition of a starting culture inducing their biological degradation and conversion into simple carbohydrates. The carbohydrates are fermented into digestible products. The starting culture comprises cleaving enzymes produced by edible microorganisms such as fungus and bacteria selected from the group consisting of *Ilumicola grisea, Trichoderma harzanum, Ruminococcus albus*.

31 Claims, 1 Drawing Sheet

6,159,510

METHOD OF BIOCONVERSION OF INDUSTRIAL OR AGRICULTURAL CELLULOSE CONTAINING WASTES

FIELD OF INVENTION

The present invention relates to utilization of organic wastes containing cellulose and occurring as surplus and waste residues associated both with agricultural and industrial manufacture.

More particularly, the present invention refers to the transferring of organic waste materials into animal feed product by virtue of the bio-conversion of a cellulosic component of such wastes into simple carbohydrates with subsequent fermenting thereof into digestible products. As an example of such wastes one can mention the straws of cereal grains such as wheat, barley, rice, oats, etc., corn stover, sugarcane bagasse, cotton, wood sawdust, paper pulp and pulp mill sludges.

It should be understood, however, that the present invention is not limited to the above listed wastes, but the scope thereof includes the utilization of other organic wastes containing a cellulose component.

BACKGROUND OF THE INVENTION

At present, it is commonly acceptable to utilize various cheap organic row materials present in the wastes of agricultural or industrial manufactures for the production of animal feed products. Therefore, available agricultural and industrial wastes represent a valuable resource for microbiological synthesis of such feed; their fermentation is of considerable practical importance. One should also bear in mind that manufacturing food products per se from organic wastes is only one aspect of their utilization while another and not less important one is the environmental aspect, since the utilization of wastes is associated with cleaning of the environment therefrom.

There is a known-in-the-art method for producing proteinaceous animal fodder from organic vegetable wastes by bio-degradation thereof with subsequent fermentation.

In U.S. Pat. No. 5,198,252, Simsa et al. discloses a method for the manufacture of fodder and/or soil improving agents by anaerobic or aerobic fermentation of vegetable environmental wastes such as aquatic plants, specifically the water hyacinth (*Eichhornia crassipes*).

The known method comprises the comminuting of harvested plants, mixing them with the organic waste material of the food industry and/or agriculture industry, adding to the mixture an inoculating agent, a biological degradation agent and a starter culture and, finally, anaerobically fermenting the mixture for 2–45 days.

An inoculating agent is selected from the group including a pectin cleaving enzyme and a thermophillic lactic acid bacterial culture. A degradation agent is chosen from the group consisting of molasses, urea and organic carboxylic acids, and a starter culture having high cellulase activity is selected from the group consisting of *Trichoderma viridae*, *Chaetonium globusum* and Actinomycetes.

There are a number of serious disadvantages associated with the method disclosed in the above patent. The first of these disadvantages lies in the fact that the known method requires mixing of the comminuted wastes with a ready-to-use commercially available enzyme, namely pectinaze, which is a relatively expensive product and has reduced cleaving efficiency compared with the efficiency of an enzyme which could be formed in situ by a microorganism during the bio-conversion process itself.

Another significant shortcoming of the known method is the introduction of molasses, which is a source of glucose and pentozes. It is well known that these carbohydrates inhibit the hydrolysis process effected by a starter culture and thus reduce the efficiency of the whole bio-conversion process. As a result the cellulose initially contained in aquatic plants and vegetable wastes may remain unconverted within the fodder. Furthermore, the above carbohydrates inhibit the fermentation of the starter culture pectinaze, thus preventing the hydrolysis of pectine initially contained in wastes. Pectin may also remain unconverted in the fodder. All of the above are associated with receiving a food product which has a high content of cellulose and low digestibility.

Unfortunately, the introduction of molasses is associated with even more disadvantages, namely, with the fact that the formation of organic acids during biological degradation and fermentation of the mixture takes place because of the hydrolysis of cellulosic products contained in the waste itself, i.e. cellulose, hemicellulose, lignin, and not because of the fermentation and assimilation of carbohydrates contained in molasses. This also reduces the efficiency of the bio-conversion process and thus the quality of the final product.

OBJECTS OF THE INVENTION

The object of the present invention is to provide for a new and improved method of utilizing the organic agricultural or industrial cellulose-containing wastes which would sufficiently reduce or overcome the above mentioned drawbacks of the known method.

In particular, the main object of the present invention is to provide for a new and improved method of utilizing organic cellulose containing wastes, which enables production of a proteinaceous nutrition product which has an increased amount of protein and improved digestibility.

The second object of the present invention is to provide for a new and improved method of utilizing of organic wastes without the use of molasses or any other substances containing glucose or other carbohydrates.

A further object of the present invention is to provide for a new and improved method for the bio-conversion of organic wastes into edible food products suitable for the nutrition of microorganisms by utilizing organic wastes, for example, animal or poultry manure.

The above and other objects of the present invention are achieved by virtue of dedicated microorganisms capable of effecting the hydrolysis of cellulosic products up to glucose, cellobiose and pentose with subsequent assimilation thereof by said microorganisms and conversion into organic acids and protein.

The above and other objects and advantages of the present invention can be achieved in accordance with the following combination of its essential features, referring to different embodiments thereof. These embodiments can be attributed to three independent groups, one of which refers to a method of bio-conversion of organic cellulose containing wastes into a nutrition product, another one into a nutrition product produced by the bio-conversion method and the third one to a starting culture necessary for effecting the bio-conversion method.

The first group of embodiments of the present invention refers to a method of utilization of organic wastes.

According to one of the preferred embodiments the method comprises the following steps:

a) the comminution of organic wastes into particulated form
b) the moistening of said wastes up to at least 45%
c) the addition to said wastes of a starting culture, said starting culture comprising a source of cleaving enzymes capable of inducing biological degradation of a cellulosic material present within said wastes and the conversion thereof into simple carbohydrates,
d) the fermenting of said simple carbohydrates into digestible products.

In accordance with another embodiment the source of cleaving enzyme comprises an edible microorganism, said microorganism being a fungus or bacteria chosen from the group including *Humicola grisea, Trichoderma harzianum, Ruminococcus Albus* or mixtures thereof.

As per still a further preferred embodiment the method comprises the addition to said wastes of a fermenting microorganism, preferably mesofilic lactic acid bacteria cultures chosen from the group containing *Lactococcus lactis susp.cremoris, Lactococcus lactis susp.* or mixtures thereof.

In accordance with another preferred embodiment the method comprises the addition to said wastes of a yeast capable of genrating protein within the edible microorganism, e.g., *Sacharomyces cerevisiae*.

According to still a further preferred embodiment the method comprises the addition to said wastes of at least one substance suitable for the nutrition of said starting culture.

In another preferred embodiment this substance is an organic or inorganic substance chosen from the group consisting of $(NH_4)_2SO_4$, urea, NaCl, animal or poultry manure or a combination thereof.

In yet another preferred embodiment the method comprises the packing of moistened wastes together with said starting culture into a vacuum-tight package so as to conduct the fermenting step substantially under the exclusion of air.

In accordance with still a further preferred embodiment said fermenting step is conducted for 1–10 days, preferably for 5–10 days.

The second group of preferred embodiments of the present invention refers to a proteinaceous nutrition product per se and in accordance with one of the preferred embodiments this product comprises:
a) a cellulosic component containing in organic wastes and which is suitable for cleaving into simple carbohydrates, said cellulosic component being comminuted into particulated form, and
b) a starting culture capable of inducing biological degradation of said comminuted cellulosic component and cleaving thereof into simple carbohydrates with subsequent fermenting thereof into digestible products.

In another preferred embodiment said starting culture comprises a source of cleaving enzyme, said source being an edible microorganism, preferably a fungus or bacteria chosen from the group including *Humicola grisea, Trichoderma harzianum, Ruminoccocus albus* or mixtures thereof.

As per still a further embodiment said starting culture comprises a dedicated fermenting means capable of inducing fermentation of said simple carbohydrates into organic acids, vitamins or other digestible products.

According to another embodiment said fermenting means is a mesofilic lactic acid bacteria culture chosen from the group containing *Lactococcus lactis susp.cremoris, Lactococcus lactis subsp. Lactis* or mixtures thereof.

In a further embodiment said starting culture comprises a yeast capable of synthesizing protein within the edible microorganism, e.g. *Sacharomyces cerevisiae*.

In still a further embodiment the product comprises at least one additive suitable for nutrition of said starting culture, said additive being an organic or inorganic substance chosen from the group consisting of $(NH_4)_2SO_4$, urea, NaCl, animal or poultry manure or combinations thereof.

According to another preferred embodiment the product comprises at least 45% of moisture, and it is placed within a vacuum-tight package.

The third group of embodiments refers to a starting culture per se and in accordance with one of the preferred embodiments this culture comprises a source of cleaving enzymes capable of inducing the biological degradation of cellulosic material contained in organic wastes and cleaving thereof into simple carbohydrates with subsequent fermenting thereof into digestible products.

As per another the source the cleaving enzyme is an edible microorganism, preferably a fungus or bacteria chosen from the group including *Humicola grisea, Trichoderma harzianum, Ruminoccocus albus* or mixtures thereof.

In a further embodiment the starting culture comprises a dedicated fermenting means capable to inducing the fermentation of simple carbohydrates into organic acids, vitamins or other digestible products.

According to still a further embodiment, said fermenting means is a mesofilic lactic acid bacteria culture chosen from the group containing *Lactococcus lactis susp.cremoris, Lactococcus lactis subsp. lactis* or mixtures thereof.

As per yet another embodiment the starting culture comprises a yeast capable of generating protein within said edible microorganism, e.g., *Sacharomyces cerevisiae*.

The present invention in its various embodiments referring to the different groups above has only been briefly summarized.

For a better understanding of the present invention as well of its benefits and advantages, reference will now be made to the following description of its embodiments taken in combination with the accompanying drawing.

DETAILED DESCRIPTION OF SPECIFIC EMBODIMENTS

Figure 1:
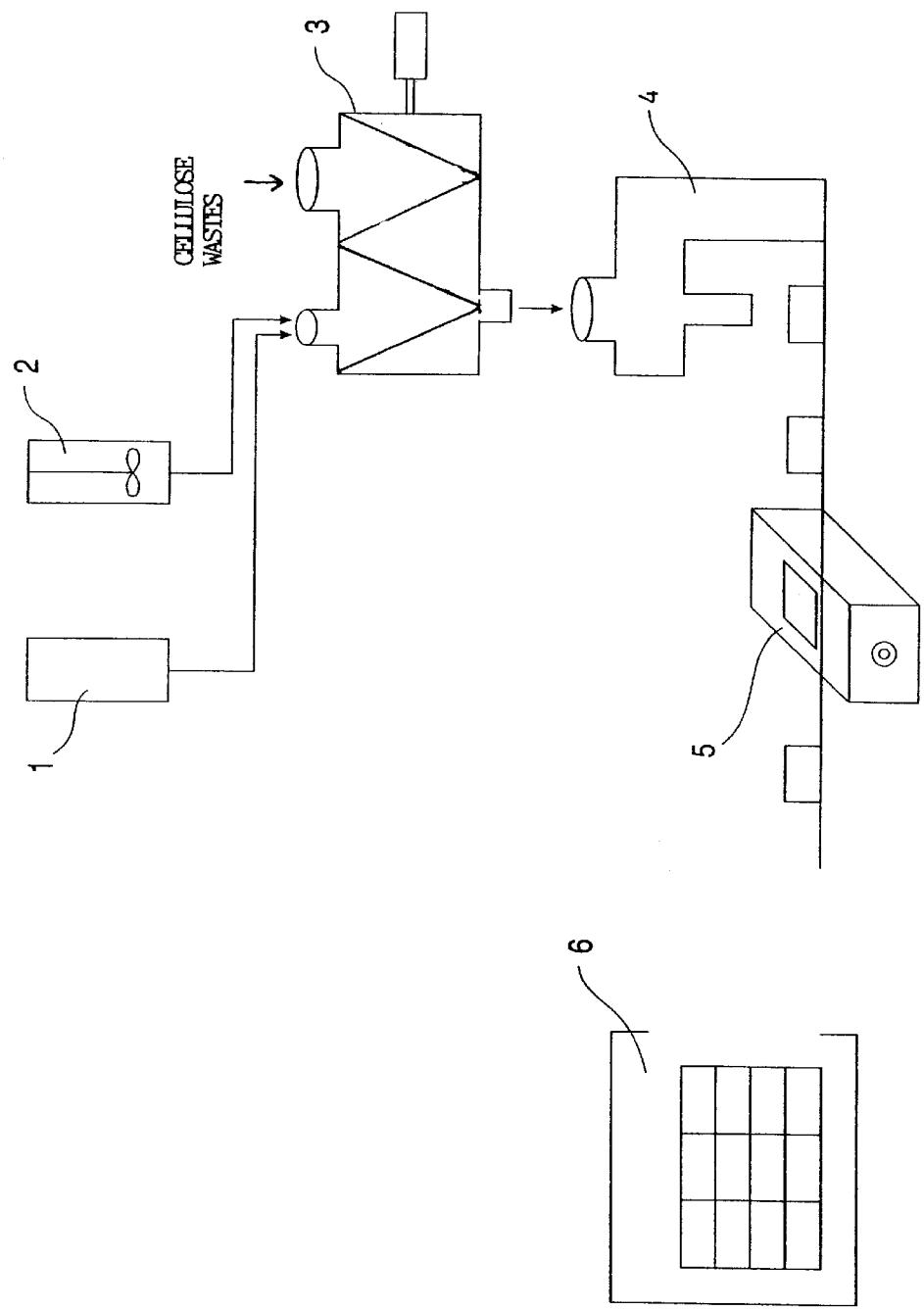
FIG. 1 schematically shows a flow chart diagram of a method for the utilization of organic wastes in accordance with the present invention and a system for implementation of said method.

With reference to FIG. 1, schematically presented there is a flow chart for implementation of the present invention by virtue of a system comprising the following main units: a tank 1 with water solution of mineral salts for moisturizing of organic wastes, a fermenter 2 with aqueous solution suitable for the cultivation of microorganisms required for effecting the bio-conversion of organic wastes, a preparation unit 3 for receiving the row wastes, comminuting and moisturizing thereof, mixing with the starting culture and with other components and homogenizing, a packaging unit 4 for placing the mixture into appropriate plastic containers, a sealing unit 5 for vacuum tight sealing of containers and a storage/fermentation unit 6 for storing sealed containers and fermentation of the biomass packed therein.

The utilization of organic wastes containing cellulose and the transfer thereof into a nutrition product suitable for animal feed is carried out in accordance with the present invention as follows. Vegetable wastes, for example, wheat straw are brought to preparation unit 1 and are ground up therein to particles size 1.0–1.5 cm. Then the liquid solution of the starting culture from fermenter 2 and aqueous solution of mineral salts from tank 1 are added to the contents of the preparation unit. Upon moistening of wastes up to 60–65% the mixture is homogenized within the preparation unit and is forwarded therefrom to packaging unit 4 for placing into polyethylene bags and then to sealing unit 5 for vacuum tight sealing. From this point the sealed bags are transported to a storage/fermentation unit where appropriate humidity and temperature 18–30° C. are kept so as to effect fermentation of the mass within sealed bags under the exclusion of air for 1–10 days up to the obtaining of a proteinaceous nutrition product. The final product can be stored in sealed bags for 1 year.

In the diagram the preparation unit is shown as a single unit, in which comminuting, moisturizing, mixing with starting culture and homogenizing of the mixture are carried out. It should be realized, however, that in practice it is not necessary that all the above steps take place in the same unit. For example, comminuting of wastes can be done in a separate piece of equipment from which the ground waste is transported to a bin of preparation unit. Here the ground wastes are moisturized and mixed with the starting culture to initiate the bio-conversion.

In accordance with the present invention it has been empirically found that excellent properties of the final nutrition product in terms of amount of protein and digestibility can be achieved if the starting culture comprises at least one edible microorganism which is a fungus or bacteria chosen from the group including *Humicola griseas, Trichoderma harzianum, Ruminococcus albus* or combinations thereof. It is also advantageous if the bio-synthesis of protein in the edible microorganisms is promoted, for example, by means of a yeast which is added to the starting culture. As such a yeast one can use, for example, *Sacharomyces cerevisiae* which has an activity of $10^{10}$ cells per gram of dry substance.

It has also been empirically established that the efficency of bio-conversion, in general, and fermentation, in particular, can be significantly improved if a fermenting microorganism is added to said wastes, said microorganism being a mesofilic lactic acid bacteria culture chosen from the group containing *Lactococcus lactis susp.cremoris, Lactococcus lactis subsp.* or mixtures thereof.

It is also beneficial for the quality of the final product if at least one substance suitable for nutrition of microorganisms of the starting culture is added to the unconverted wastes before bringing therein the starting culture. Examples of such substances are organic or inorganic salts, urea, animal or poultry manure. It might be advantageous if these substances are prepared as an aqueous solution within tank 1 and are added therefrom to the unconverted wastes brought to preparation unit 1. It should be realized, however, that these substances can be added to the unconverted wastes in dry form with subsequent moisturizing.

With reference to the following non limited examples 1–4 the present invention will now be disclosed in more details.

EXAMPLE 1

1000 kg of wheat straw wastes are ground up to a particle size 1–1.5 cm within a bin of the fermenter 2. To the ground wastes are added 12 kg of $(NH_4)_2SO_4$, 8 kg of urea and 5 kg of NaCl. The mixture is moisturized by water up to 60–65% of the weight of dry straw wastes and then a starting culture is introduced, said culture consisting of 0.5 g of *Sacharomyces cerevisiae,* 0.5 g of a mixture of dry mesofilic lactic acid bacteria cultures *Lactococcus lactis susp.cremoris, Lactococcus lactis subsp. lactis,* 0.5 g of *Humicola grisea,* 0.5 g of *Trichoderma harzianum* and 0.5 g of *Ruminococcus albus*. The mixture is mixed, homogenized, packed in polyethylene bags and vacuum-tight sealed. The fermentation process takes place in sealed bags during 1–10 days at 25–30° C. Fermentation resulted in a nutrition ruminant product, the composition of which included protein, organic acids and group B vitamins.

Summarized in non limiting table 1 below is the content of the nutrition product produced in accordance with the above procedure compared with the content of a non converted dry straw.

From the results it follows that the bio-converted nutrition product contains 15% protein, 1–7% lactic acid, and 0.5–1.0% acetic acid. The amount of cellulose after fermentation, in comparison, with dry straw is reduced by 10%, lignin by 5.7% and non destructible fiber (NDF) by 24%.

TABLE 1

| Compound | Unit | Dry straw | Example 1 |
| --- | --- | --- | --- |
| Fat | g/100 g | 0.0 | 1.0 |
| Crude protein | g/100 g | 3.0 | 15.0 |
| Ashes | | 10.4 | 15.0 |
| Cellulose | | 48.8 | 38.8 |
| Lignin | | 30.0 | 24.6 |
| Lactic acid | | 0.0 | 7.0 |
| Acetic acid | | 0.0 | 1.0 |
| pH | | 6.0 | 4.2 |
| NDF (non destructible fiber) | | 54.0 | 30.0 |

EXAMPLE 2

500 kg of wheat straw wastes are ground up using the the procedure and equipment similar to that of example 1. Added to the ground wastes are 500 kg of poultry manure, 12 kg of $(NH_4)_2SO_4$, 5 kg of NaCl and the mixture is moisturized by water up to 60–65% of the weight of the dry straw. Added to the moist mixture is a starting culture consisting of 1.5 g of a mixture of mesofilic lactic acid bacteria cultures *Lactococcus lactis susp.cremoris, Lactococcus lactis subsp. lactis* having an activity of $10^{10}$ cells per gram of dry substance, 0.5 g of *Humicola grisea,* 0.5 g of *Trichoderma harzianum* and 0.5 g of *Ruminococcus albus*. The mixture is thoroughly mixed, homogenized, packed in sealed vacuum-tight polyethylene bags. The fermentation process takes place in sealed bags during 1–10 days at 25–30C. Fermentation results in a nutrition product, the composition of which includes protein, organic acids, fat and group B vitamins.

Summarized in non limiting table 2 below is the content of the nutrition product produced in accordance with the above procedure compared with the content of a non converted dry straw.

TABLE 2

| Compound | Unit | Dry straw | Example 2 |
| --- | --- | --- | --- |
| Fat | g/100 g | 1.31 | 4.45 |
| Crude protein | g/100 g | 7.34 | 20.79 |
| Ashes | | 18.82 | 27.61 |
| Cellulose | | 27.70 | 17.50 |
| Lignin | | 10.80 | 5.00 |
| Lactic acid | | 0.00 | 6.30 |
| Acetic acid | | 0.00 | 2.70 |
| pH | | 7.50 | 4.75 |
| NDF (non destructible fiber) | | 56.10 | 37.87 |

From the above results it follows that the bio-converted nutrition product contains 10–20% protein, 1–7% lactic acid, 0.5–1.0% acetic acid, 4.0–4.5% fat. The amount of cellulose after fermentation, in comparison with unconverted dry straw, is reduced by 10.2%, lignin by 5.8% and non destructible fiber (NDF) by 18.23%.

EXAMPLE 3

850 kg of algae seaweed wastes of agar—agar manufacture together with 150 kg of wheat straw are ground up using a procedure and equipment similar to that of example 1. Added to the ground up wastes there are 12 kg of $(NH_4)_2SO_4$. The mixture is moisturized by water up to 60–65% of the weight of dry wastes. Added to the moist mixture is a starting culture consisting of 1.5 g of a mixture of mesofilic lactic acid bacteria cultures *Lactococcus lactis susp.cremoris, Lactococcus lactis subsp. lactis*, 0.5 g of *Humicola grisea*, 05 g of *Trichoderma harzianum* and 0.5 g of *Ruminococcus albus*. The mixture is thoroughly mixed, homogenized, packed in sealed vacuum-tight polyethylene bags. The fermentation process takes place in sealed bags during 1–10 days at 25–30° C. Fermentation results in a nutrition product the composition of which includes protein and organic acids.

Summarized in non limiting table 3 is the content of nutrition product produced in accordance with the above procedure compared with the content of a non converted algae straw.

TABLE 3

| Compound | Unit | Algae straw | Example 3 |
| --- | --- | --- | --- |
| Fat | g/100 g | 1.31 | 1.60 |
| Crude protein | g/100 g | 11.00 | 25.80 |
| Ashes | | 8.00 | 9.15 |
| Lactic acid | | 0.00 | 12.00 |
| Acetic acid | | 0.00 | 1.00 |
| pH | | 7.00 | 4.20 |
| NDF (non destructible fiber) | | 28.50 | 20.0 |

From the above results it follows that bio-converted nutrition product contains 25.8% protein, 12% lactic acid, 1.0% acetic acid. The amount of non destructible fiber (NDF) is reduced by 8.5%.

EXAMPLE 4

500 kg of cotton straw and cotton seed wastes are ground up to a particle size of 0.5 cm in equipment similar to that of example 1. Added to the ground wastes are 500 kg of sterile poultry manure, 12 kg of $(NH_4)_2SO_4$, 5 kg of NaCl and the mixture is moisturized so as to bring the moisture content up to 60–65% of the weight of dry wastes. Added to the moist mixture is a starting culture consisting of 1.5 g of a mixture of mesofilic lactic acid bacteria cultures *Lactococcus lactis susp.cremoris, Lactococcus lactis subsp. lactis*, 0.5 g of *Humicola grisea*, 0.5 g of *Trichoderma harzianum* and 0.5 g of *Ruminococcus albus*. The mixture is thoroughly mixed, homogenized, packed in polyethylene bags and vacuum-tight sealed. The fermentation process takes place in sealed bags during 1–12 days at 18–30° C. Fermentation results in a nutrition product the composition of which includes protein, organic acids and group B vitamins.

In non limiting table 4 below there is summarized content of nutrition product produced in accordance with the above procedure compared with the content of non converted dry cotton wastes.

TABLE 4

| Compound | Unit | Cotton wastes | Example 4 |
| --- | --- | --- | --- |
| Fat | g/100 g | 0.5 | 1.5 |
| Crude protein | g/100 g | 7.0 | 14.3 |
| Ashes | | 20.0 | 22.0 |
| Cellulose | | 33.0 | 25.0 |
| Lignin | | 28.9 | 23.2 |
| Lactic acid | | 0.0 | 7.0 |
| Acetic acid | | 0.0 | 0.5 |

TABLE 4-continued

| Compound | Unit | Cotton wastes | Example 4 |
| --- | --- | --- | --- |
| pH | | 4.2 | 4.2 |
| NDF (non destructible fiber) | | 54.5 | 42.5 |

From the above results it follows that the bio-converted nutrition product contains 10–14% protein, 1–7% lactic acid, 0.5–1.0% acetic acid. The amount of cellulose after fermentation in comparison with dry unconverted cotton wastes is reduced by 8%, lignin by 5.7% and non destructible fiber (NDF) by 12%.

It should be appreciated that the present invention is not limited to the above-described examples and embodiments and that changes and modifications can be made by one ordinarily skilled in the art without deviation from the scope of the invention as will be defined below in the appended claims.

It should also be appreciated that the features disclosed in the foregoing description, and/or in the following claims, and/or in the accompanying drawings, and/or examples, and/or tables may, both separately and in any combination thereof, be material for realizing the present invention in diverse forms thereof.

What is claimed is:

1. A process of conversion of low protein, cellulose containing waste into a fodder or fodder supplement, the process comprising the steps of:
    (a) inoculating the waste under aerobic conditions with a first inoculum including at least one first microorganism capable of converting cellulose into carbohydrates and at least one second microorganism capable of converting carbohydrates into proteins to thereby efficiently convert at least a portion of said cellulose into nutritional proteins and prevent accumulation of said carbohydrates and thereby inhibition of said conversion of said cellulose into said carbohydrates; and
    (b) inoculating the waste, under anaerobic conditions, with a second inoculum including at least one third microorganism capable of converting cellulose into carbohydrates and at least one fourth microorganism capable of converting carbohydrates into a preservative organic acid to thereby efficiently convert at least a portion of said cellulose into said preservative organic acid and prevent accumulation of carbohydrates and thereby inhibition of said conversion of said cellulose into said carbohydrates.

2. The process of claim 1, wherein said anaerobic conditions are effected by packaging the cellulose containing waste within a vacuum treated airtight bag.

3. The process of claim 1, wherein said first inoculum and said second inoculum are added concomitantly to the cellulose containing waste.

4. The process of claim 1, further comprising the addition to said waste of at least one substance suitable for the nutrition of said first inoculum and said second inoculum.

5. The process of claim 4, wherein said substance is an organic or inorganic substance selected from the group consisting of $(NH_4)_2SO_4$, urea, NaCl and animal or poultry manure.

6. The process of claim 1, wherein said at least one first microorganism is an edible microorganism, said microorganism being a fungus or bacteria of a genus selected from the group consisting of Humicola, Trichoderma and Ruminococcus.

7. The process of claim 6, wherein said at least one first microorganism is selected from the group consisting of *Humicola grisea, Trichoderma harzianum* and *Ruminococcus albus*.

8. The process of claim 1, wherein said at least one second microorganism is a fungus of the genus Saccharomyces.

9. The process of claim 8, wherein said at least one second microorganism is *Saccharomyces cerevisiae*.

10. The process of claim 1, wherein said at least one third microorganism is an edible microorganism, said microorganism being a bacteria of a genus Ruminococcus.

11. The process of claim 10, wherein said at least one third microorganism is *Ruminococcus albus*.

12. The process of claim 1, wherein said at least one fourth microorganism is an edible microorganism, said microorganism being a bacteria of a genus Lactococcus.

13. The process of claim 12, wherein said at least one fourth microorganism is selected from the group consisting of *Lactococcus lactis subsp lactis* and *Lactococcus lactis subsp cremoris*.

14. The process of claim 1, wherein said waste is mechanically degraded into a particulate form.

15. The process of claim 1, wherein said waste is moistened by water to 45–65 % of the dry weight of said waste.

16. The process of claim 1, wherein said cellulose containing waste is selected from the group consisting of plant waste, paper waste and animal manure waste.

17. The process of claim 1, wherein said aerobic step prolongs 1–10 days.

18. The process of claim 1, wherein said anaerobic step prolongs at least 1 day.

19. A starting culture for conversion of low protein, cellulose containing, waste into a high protein fodder or fodder supplement, the starting culture comprising:
(a) at least one first microorganism capable of converting cellulose into carbohydrates under aerobic conditions;
(b) at least one second microorganism capable of converting carbohydrates into proteins under aerobic conditions;
(c) at least one third microorganism capable of converting cellulose into carbohydrates under anaerobic conditions; and
(d) at least one fourth microorganism capable of converting carbohydrates into a preservative organic acid under anaerobic conditions.

20. The starting culture of claim 19, wherein said anaerobic conditions are effected by packaging the cellulose containing waste within a vacuum treated airtight bag.

21. The starting culture of claim 19, wherein said first inoculum and said second inoculum are added concomitantly to the cellulose containing waste.

22. The starting culture of claim 19, further comprising the addition to said waste of at least one substance suitable for the nutrition of said first inoculum and said second inoculum.

23. The starting culture of claim 22, wherein said substance is an organic or inorganic substance selected from the group consisting of $(NH_4)_2SO_4$, urea, NaCl and animal or poultry manure.

24. The starting culture of claim 19, wherein said at least one first microorganism is an edible microorganism, said microorganism being a fungus or bacteria of a genus selected from the group consisting of Humicola, Trichoderma and Ruminococcus.

25. The starting culture of claim 24, wherein said at least one first microorganism is selected from the group consisting of *Humicola grisea, Trichoderma harzianum* and *Ruminococcus albus*.

26. The starting culture of claim 19, wherein said at least one second microorganism is a fungus of the genus Saccharomyces.

27. The starting culture of claim 26, wherein said at least one second microorganism is *Saccharomyces cerevisiae*.

28. The starting culture of claim 19, wherein said at least one third microorganism is an edible microorganism, said microorganism being a bacteria of a genus Ruminococcus.

29. The starting culture of claim 28, wherein said at least one third microorganism is *Ruminococcus albus*.

30. The starting culture of claim 19, wherein said at least one fourth microorganism is an edible microorganism, said microorganism being a bacteria of a genus Lactococcus.

31. The starting culture of claim 30, wherein said at least one fourth microorganism is selected from the group consisting of *Lactococcus lactis subsp lactis* and *Lactococcus lactis subsp cremoris*.

* * * * *